United States Patent
Stand et al.

(10) Patent No.: US 10,351,768 B2
(45) Date of Patent: Jul. 16, 2019

(54) INTRINSIC AND ACTIVATED $A_4BX_6$ SCINTILLATORS

(71) Applicant: University of Tennessee Research Foundation, Knoxville, TN (US)

(72) Inventors: Luis Stand, Knoxville, TN (US); Mariya Zhuravleva, Knoxville, TN (US); Kan Yang, Solon, OH (US); Charles L. Melcher, Oak Ridge, TN (US); Adam Coleman Lindsey, Charlotte, NC (US)

(73) Assignee: UNIVERSITY OF TENNESSEE RESEARCH FOUNDATION, Knoxville, TN (US)

( * ) Notice: Subject to any disclaimer, the term of this patent is extended or adjusted under 35 U.S.C. 154(b) by 202 days.

(21) Appl. No.: 15/352,566

(22) Filed: Nov. 15, 2016

(65) Prior Publication Data
US 2017/0218265 A1    Aug. 3, 2017

Related U.S. Application Data

(60) Provisional application No. 62/256,822, filed on Nov. 18, 2015.

(51) Int. Cl.
*C09K 11/77*    (2006.01)

(52) U.S. Cl.
CPC ............... *C09K 11/7733* (2013.01)

(58) Field of Classification Search
CPC .............. C09K 11/7733; C09K 11/772; C09K 11/7705
See application file for complete search history.

(56) References Cited

U.S. PATENT DOCUMENTS

| | | | |
|---|---|---|---|
| 8,878,135 B2 * | 11/2014 | Srivastava | G01T 1/20 250/361 R |
| 2012/0193539 A1 * | 8/2012 | Bizarri | C09K 11/7733 250/361 R |
| 2012/0273726 A1 | 11/2012 | Zhuravleva et al. | |

FOREIGN PATENT DOCUMENTS

| WO | 2015/010055 | 1/2015 |
|---|---|---|
| WO | 2015/172026 | 11/2015 |

OTHER PUBLICATIONS

Bizarri et al., "Scintillation and Optical Properties of BaBrI: Eu2+ and CsBa2I5: Eu2+", IEEE Transactions on Nuclear Science, vol. 58, No. 6, Dec. 2011, pp. 3403-3410.
Bollinger et al., "Measurement of the Time Dependence of Scintillation Intensity by a Delayed-Coincidence Method", The Review of Scientific Instruments, vol. 32, No. 9, Sep. 1961, pp. 1044-1050.
Dorenbos, "Energy of the first 4f7--> 4f65d transition of Eu2+ in inorganic compounds", Journal of Luminescence 104, Feb. 2003, pp. 239-260.
Gahane et al., "Luminescence of Eu2+ in some iodides", Optical Materials 32, Jun. 2009, pp. 18-21.
Gascon et al., "Scintillation properties of CsBa2I5 activated with monovalent ions Tl+, Na+ and In+", Journal of Luminescence 156, Aug. 2014, pp. 63-68.
Gektin et al., "Scintillation Efficiency Improvement by Mixed Crystal Use", IEEE Transactions on Nuclear Science, vol. 61, No. 1, Feb. 2014, pp. 262-270.
Shirwadkar et al., "New promising scintillators for gamma-ray spectroscopy: Cs(Ba,Sr)(Br,I)3", IEEE Nuclear Science Symposium Conference Record, Oct. 23-29, 2011, pp. 1583-1585.
Wei et al., "The scintillation properties of CeBr3_xClx single crystals", Journal of Luminescence 156, Aug. 2014, pp. 175-179.
Wei et al., "Two new cerium-doped mixed-anion elpasolite scintillators: Cs2NaYBr3I3 and Cs2NaLaBr3I3", Optical Material 38, Oct. 2014, pp. 154-160.
Yang et al., "Crystal growth and characterization of CsSr1_xEuxI3 high light yield scintillators", Phys. Status Solidi RRL 5, No. 1, 43-45 (2011) / DOI:10.1002/pssr.201004434 (published online Dec. 7, 2010).
Yang et al., "Optical and Scintillation Properties of Single Crystal CsSr1_xEuxI3", Nuclear Science Symposium Conference Record (NSS/MIC), 2010 IEEE, Oct. 30-Nov. 6, 2010.
Zhuravleva et al., "New single crystal scintillators: CsCaCl3:Eu and CsCaI3:Eu", Journal of Crystal Growth 352, Feb. 2012, pp. 115-119.

* cited by examiner

*Primary Examiner* — C Melissa Koslow
(74) *Attorney, Agent, or Firm* — Hunton Andrews Kurth LLP

(57) ABSTRACT

Mixed halide scintillation materials of a first general formula $A_4B_{(1-y)}M_yX'_{6(1-z)}X''_{6z}$ and a second general formula $A_{(4-y)}BM_yX'_{6(1-z)}X''_{6z}$ are disclosed. In the general formulas, A is an alkali metal, B is an alkaline earth metal, and X' and X" are two different halogen atoms. Scintillation materials of the first general formula include a divalent external activator M such as $Eu^{2+}$ or $Yb^{2+}$ or a trivalent external activator M such as $Ce^{3+}$. Scintillation materials of the second general formula include a monovalent external activator M such as $In^+$, $Na^+$, or $Tl^+$ or a trivalent external activator such as $Ce^{3+}$.

17 Claims, 15 Drawing Sheets
(10 of 15 Drawing Sheet(s) Filed in Color)

INTRINSIC AND ACTIVATED $A_4BX_6$ SCINTILLATORS

CROSS-REFERENCE TO RELATED APPLICATIONS

This application claims benefit under 35 U.S.C. § 119(e) of U.S. Provisional Application Ser. No. 62/256,822, filed Nov. 18, 2015, the disclosure of which is incorporated herein by reference in its entirety.

BACKGROUND

The present disclosure generally relates to scintillation materials used to detect radiation such as, but not limited to, X-rays, gamma rays (γ-rays), and thermal neutron radiation.

A scintillator is a material that can absorb high-energy particles and convert these particles to multiple low-energy photons. Scintillation materials are scientifically and economically significant in conjunction with photodetectors to detect high-energy photons, electrons, and other particles in various applications, which include medical imaging, geological exploration, homeland security, and high-energy physics. In order to maximize the values of the scintillator in these applications, characteristics including high scintillation light yield, fast scintillation decay time and rise time, good energy resolution, high degree of proportionality, proper emission wavelength, and good thermal response over a wide temperature range are desired.

Halide scintillators, which contain a monovalent or a divalent external activator, have been shown to be a promising class of scintillators. Monovalent external activators include $Tl^+$, $Na^+$, and $In^+$. For example, $CsBaI_5$ doped with $Tl^+$, $Na^+$, and $In^+$ scintillators are manufactured and used as γ-ray detectors in "Scintillation Properties of $CsBaI_5$ Activated with Monovalent Ions $Tl^+$, $Na^+$ and $In^+$," by M. Gascon, et al., *Journal of Luminescence*, 2014, 156, 63-68. Divalent external activators include $Eu^{2+}$ and $Yb^{2+}$. Several $Eu^{2+}$-doped halide scintillators showing a high light output and melting congruently, which allows the scintillators to be grown using the Bridgman-Stockbarger technique, have been described. For example, $Eu^{2+}$-doped $CsSrI_3$ scintillators are prepared and their photophysical properties are disclosed in "Crystal Growth and Characterization of $CsSr_{1-x}Eu_xI_3$ High Light Yield Scintillators," by K. Yang, et al., *Rapid Research Letters*, 2011, 5, 43-45 and in "Optical and Scintillation Properties of Single Crystal $CsSr_{1-x}Eu_xI_3$," by K. Yang, et al., *Nuclear Science Symposium Conference Record (NSS/MIC)*, 2010, 1603-1606. U.S. Patent Application Publication No. 2012/0273726 by M. Zhuravleva, et al. reported the scintillation properties of $CsSrBr_3$ doped with $Eu^{2+}$. Another example, "New Single Crystal Scintillators, $CsCaCl_3$:Eu and $CsCaI_3$:Eu," by M. Zhuravleva, et al., *Journal of Crystal Growth*, 2012, 352, 115-119, described the scintillation properties of $CsCaCl_3$ and $CsCaI_3$ doped with $Eu^{2+}$. Scintillator crystals of $CsBaI_3$ doped with $Eu^{2+}$ were found to have excellent scintillator properties as disclosed in "New Promising Scintillators for Gamma-Ray Spectroscopy: $Cs(Ba,Sr)(Br,I)_3$," by U. Shirwadkar, et al., *IEEE Nuclear Science Symposium Conference Record*, 2011, 1583-1585. International Application Publication No. WO 2015/010055 by L. Stand, et al. described the scintillation properties of doped (e.g., europium-doped) ternary metal halides having general formulas $A_2BX_4$ and $AB_2X_5$, where A is an alkali metal, B is an alkaline earth metal, and X is a halide.

The use of mixed-halide scintillators, i.e., scintillators containing two or more different halide atoms, has been proposed as a means of increasing scintillator light output as shown in "Scintillation Efficiency Improvement by Mixed Crystal Use," by A. V. Gektin, et al., *IEEE Transactions on Nuclear Science*, 2014, 61, 262-270. For example, mixed-halide elpasolite scintillators of $Cs_2NaYBr_3I_3$ and $Cs_2NaLaBr_3I_3$ doped with the trivalent activator $Ce^{3+}$ are fabricated and their optical properties reported in "Two New Cerium-Doped Mixed-Anion Elpasolite Scintillators: $Cs_2NaYBr_3I_3$ and $Cs_2NaLaBr_3I_3$," by H. Wei, et al., *Optical Materials*, 2014, 38, 154-160. $Ce^{3+}$-based single crystal mixed-halide scintillators are reported in "The Scintillation Properties of $CeBr_{3-x}Ci_x$ Single Crystals," by H. Wei, et al., *Journal of Luminescence*, 2014, 156, 175-179. In another example, in "Scintillation and Optical Properties of BaBrI: $Eu^{2+}$ and $CsBa_2I_5$:$Eu^{2+}$," *IEEE Transactions on Nuclear Science*, 2011, 58, 3403-3410, G. Bizarri, et al. reported $Eu^{2+}$-doped scintillators of BaBrI. International Application Publication No. WO 2015/172026 by L. Stand, et al. described the scintillation properties mixed-halide scintillation materials having general formulas $AB_{(1-y)}M_yX'_wX''_{(3-w)}$ and $A_{(1-y)}BM_yX'_wX''_{(3-x)}$, where $0 \leq y \leq 1$, $0.05 \leq w \leq 1$, A is an alkali metal, B is an alkaline earth metal, X' and X'' are two different halogen atoms, and M is a divalent external activator in the former formula and a monovalent external activator in the latter formula.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1A:
FIGS. 1A and 1B show a crystal of an exemplary scintillator.

In some embodiments herein, the compositional formula expression of a scintillator material may contain a colon ":", wherein the composition of the main scintillation material is indicated on the left side of the colon, and the activator or dopant ion is indicated on the right side of the colon. The atomic percentage of the dopant or activator ion may also be indicated to the right side of the colon. For example, for ternary metal scintillators that comprise an alkali metal and an alkaline earth metal, the atomic percentage of a divalent dopant ion (e.g., divalent europium ion) may be expressed in atomic percentage relative to the total amount of dopant and alkaline earth metal. Thus, the dopant ion may be a divalent ion that substitutes for a percentage of the divalent alkaline earth metal ion in the base (i.e., main or undoped) ternary metal halide composition. For example, $K_2BaBr_4$:Eu 5% represents a $K_2BaBr_4$ scintillator material activated by europium, wherein 5 atomic % of the barium is replaced by europium. In some embodiments, the dopant may be a monovalent ion that substitutes for a percentage of the alkali metal ion in the base ternary metal halide composition. Thus, the atomic % of a monovalent dopant may be expressed as the atomic % relative to the total amount of dopant and alkali metal.

As used herein, chemical ions are typically represented by their chemical element symbols alone (e.g., Eu for europium ion(s) (e.g., $Eu^{2+}$) or Na for sodium ion(s) (e.g., $Na^+$)) Similarly, the terms "alkali metal" and "alkaline earth metal" are used herein to refer to an alkali metal ion or ions and an alkaline earth metal ion or ions, respectively.

The present disclosure is directed to a group of newly discovered mixed-halide scintillator compounds. These scintillators are particularly notable for their high light output, useful emission wavelength, low melting point, congruent melting, and practical crystal growth.

Mixed-halide scintillators according to embodiments of the present disclosure may include two families with the following general exemplary formulas:

(1)

and

(2)

where $0 \leq y \leq 1$, and $0 \leq z \leq 1$.

Scintillators belonging to the families represented by formulas (1) and (2) may generally be referred to as $A_4BX_6$ scintillators.

In the formula (1), M may include either a divalent external activator (such as europium (Eu) or ytterbium (Yb)) or a trivalent external activator (such as cerium (Ce)); A may include an alkali metal, (such as Li, Na, K, Rb and Cs, or In, or any combination thereof); B may include an alkaline earth metal (such as Mg, Ca, Sr, Ba, or any combination thereof); and X' and X" are two different halogen atoms (such as F, Cl, Br, I, or any combination thereof).

In the formula (2), M may include a monovalent external activator (such as indium (In), sodium (Na), or thallium (Tl)) or a trivalent external activator (such as cerium (Ce)); A may include an alkali metal, such as Li, Na, K, Rb and Cs, or In, or any combination thereof; B may include an alkaline earth metal (such as Mg, Ca, Sr, Ba, or any combination thereof); and X' and X" are two different halogen atoms (such as F, Cl, Br, I, or any combination thereof).

The compounds of formulas (1) and (2) may form excellent scintillators. These new scintillators may be suitable for radiation detection applications including medical imaging, homeland security, high energy physics experiments, and geophysical exploration. As mentioned above, these scintillators are particularly notable for their high light output, useful emission wavelength, low melting point, congruent melting, and practical crystal growth.

Embodiments of methods for making the mixed-halide scintillators according to formulas (1) and (2) will now be described. In these embodiments, anhydrous high purity (e.g., at least 4N-purity) raw materials from Sigma-Aldrich were mixed in stoichiometric ratio according to the chemical formulas of the respective compounds and loaded into clean quartz ampoules. The mixing and loading were done inside a dry glove box with moisture and oxygen content of less than 0.01 ppm. The starting materials were subsequently dried in the quartz ampoules under $10^{-6}$ torr vacuum at 200° C. for 4 hours, cooled down to room temperature, and sealed inside of the quartz ampoules under vacuum with a hydrogen torch.

A single-zone furnace may be used to melt and synthesize compounds of formulas (1) and (2), but it is to be appreciated that other furnaces, including without limitation a two-zone transparent furnace and a three-zone vertical Bridgman furnace, may be used. Synthesis techniques including without limitation, Bridgman method, electronic dynamic gradient method, Czochralski method, micro-pulling down method, thin film deposition, melt-freezing, and ceramic hot pressing may be used to produce the final product in poly-crystal, single crystal, thin film, or ceramic forms.

According to an embodiment, a single zone clamshell furnace was used to melt and synthesize 4-gram samples of compounds of the formula (1). For each sample, the melt and synthesis temperature was raised to 20° C. above the highest melting point of the starting materials used. The temperature was held for 7 hours and cooled down to room temperature in 7 hours. The ampoule was inverted and the procedure above was repeated to encourage complete mixing and reacting of all starting materials. This resulted in polycrystalline samples with analogous physical, optical, and scintillation properties of corresponding grown single crystals. The scintillation properties of one such sample, $Cs_4CaI_6$:Eu 4%, are included in Table I below. Table I also includes scintillation properties of exemplary rapid melt-freeze samples of compounds of the formula (1). It is to be appreciated that the results shown in Table I may be improved by optimizing the crystal growth protocols.

TABLE I

| Composition | Light Yield (ph/MeV) | Radioluminescence peak (nm) | Energy Resolution (%) | Scintillation Decay (ns) | |
|---|---|---|---|---|---|
| $Cs_4CaI_6$: Eu 4% | ~50,000 | 474 | 3.6 | 1,600 (92%), 500 | Grown crystal |
| $Cs_4CaBrI_5$: Eu 4% | ~35,017 | 469 | | 1150 (75%), 3000 | Rapid melt-freeze sample |
| $Cs_4CaBr_6$: Eu 4% | ~14,298 | 459 | | 1310 (58%), 3700 | Rapid melt-freeze sample |
| $Cs_4SrI_6$: Eu 4% | ~37,300 | 468 | n/a | 1900 | Rapid melt-freeze sample |
| $K_4SrI_6$: Eu 4% | ~48,880 | 455 | n/a | 1600 (80%), 870 | Rapid melt-freeze sample |
| $Cs_4BaI_6$: Eu 4% | ~28,180 | 460 | n/a | 1200 (56%), 5900 | Rapid melt-freeze sample |

Figure 1B:
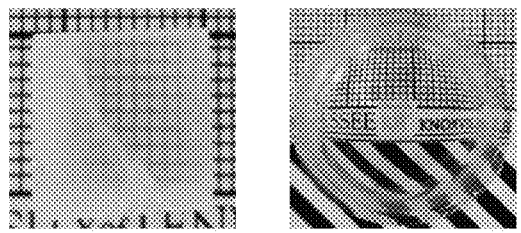

To allow for the observation of melting, nucleation, and evolution of the interface shape of an exemplary $Cs_4CaI_6$:Eu 4% scintillator, a 17-mm Bridgman crystal growth of the exemplary Cs$_4$CaI$_6$:Eu 4% scintillator was carried out in a two-zone transparent furnace. The resulting crystal is shown in FIGS. 1A and 1B. In FIG. 1A, the crystal growth of the Cs$_4$CaI$_6$:Eu 4% scintillator in the ampoule is shown. FIG. 1B shows on the left a 10×10×10 mm$^3$ sample and on the right a 5×5×5 mm$^3$ sample of the exemplary Cs$_4$CaI$_6$:Eu 4% scintillator.

FIGS. 2A-2F are graphs showing X-ray excited radioluminescence spectra corresponding to the exemplary scintillators in Table I. Radioluminescence spectra were measured at room temperature under continuous irradiation from an X-ray generator model CMX003 (at 32 kV and 0.1 mA). A model PI Acton Spectra Pro SP-2155 monochromator was used to record the spectra. The single-peak emission observed in the radioluminescence spectra shown in the FIGS. 2A-2F may be solely attributed to characteristic emission of Eu$^{2+}$ 5d to 4f transitions, which shows that Eu$^{2+}$ enters the lattice in divalent form. The energy of Eu$^{2+}$ 5d-4f excited states is described by P. Dorenbos in "Energy of the First 4f$^7$-4f$^6$5d Transition of Eu$^{2+}$ in Inorganic Compounds," *Journal of Luminescence*, 2003, 104, 239-260 and luminescence from this excited state is reported by D. H. Gahane, et al., in "Luminescence of Eu$^{2+}$ in Some Iodides," *Optical Materials*, 2009, 32, 18-21.

Figure 2A:
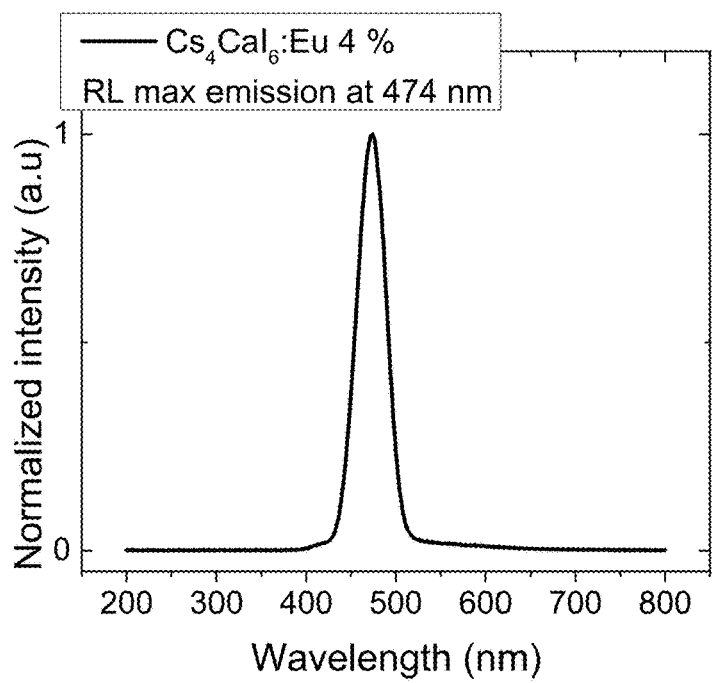
FIGS. 2A-2F are graphs showing X-ray excited radioluminescence spectra of scintillator samples.
Figure 2B:
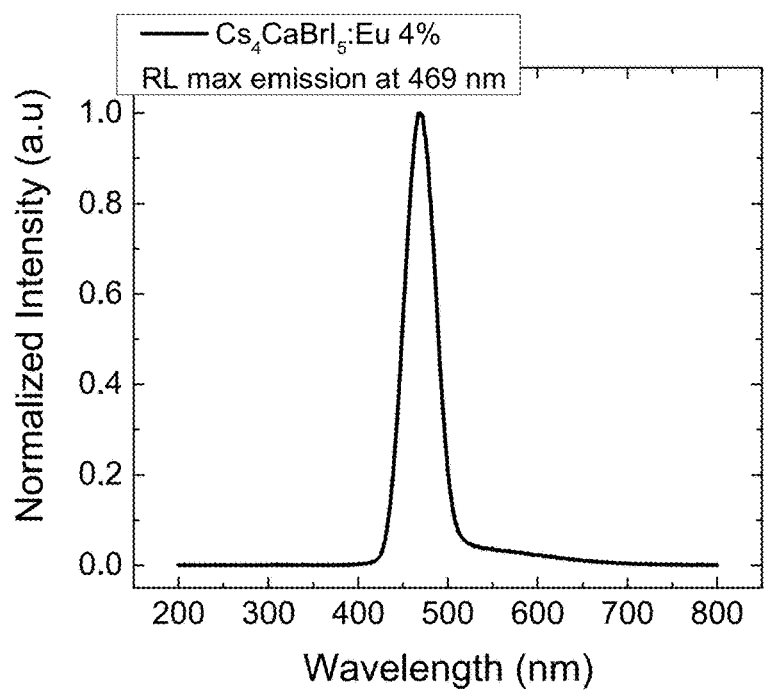
Figure 2C:
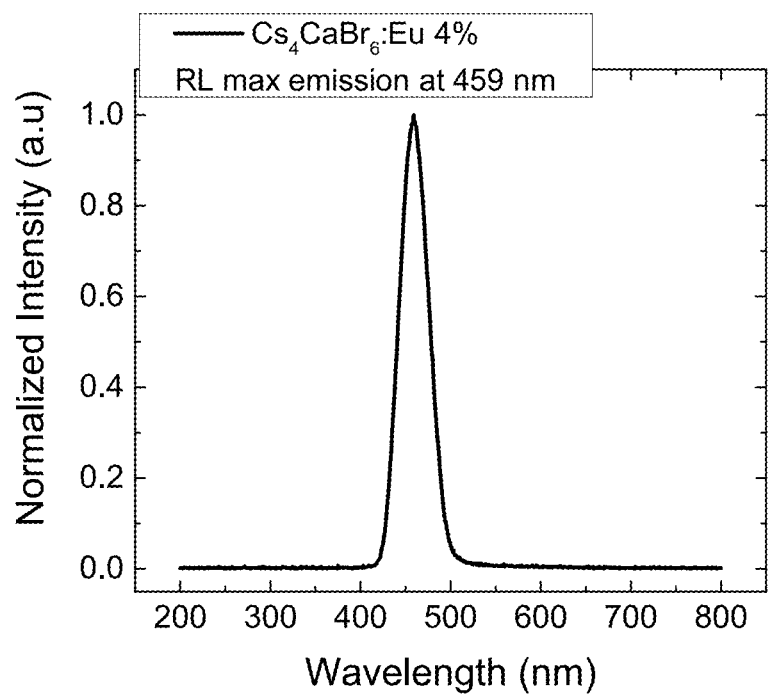
Figure 2D:
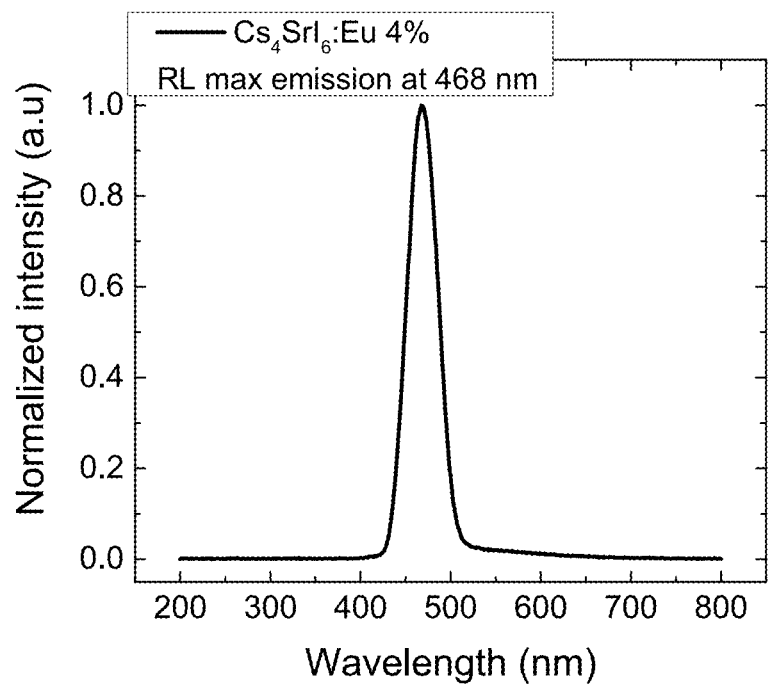
Figure 2E:
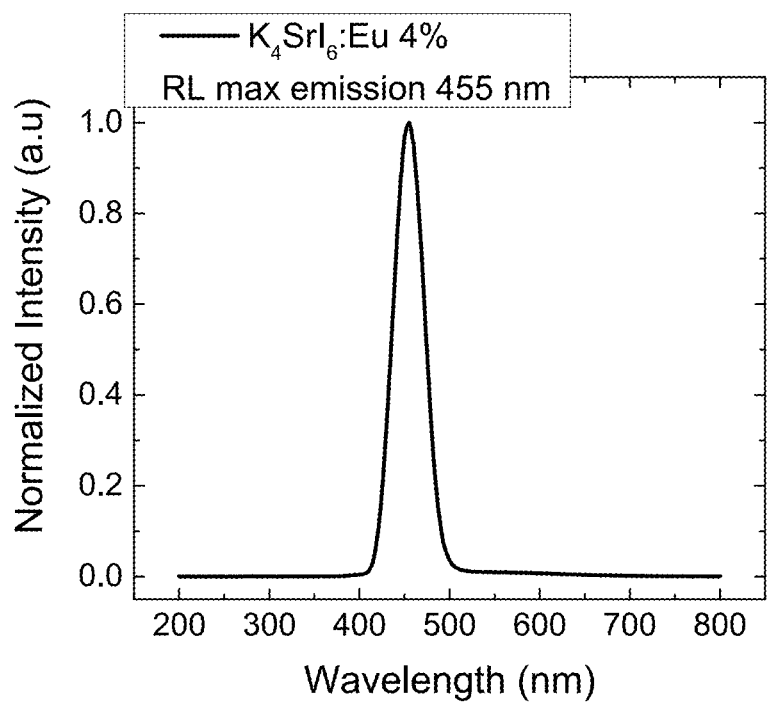
Figure 2F:
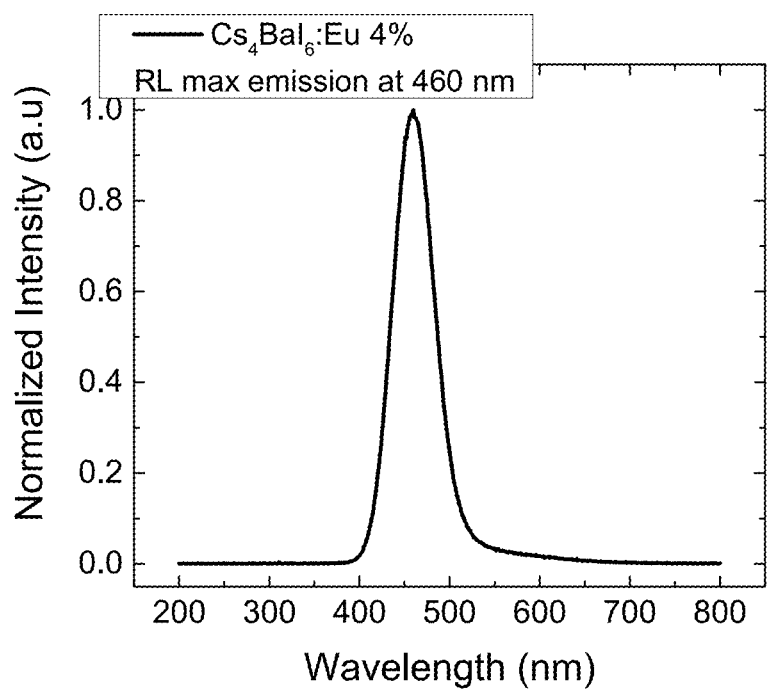

FIG. 2A shows the exemplary Cs$_4$CaI$_6$:Eu 4% scintillator having a single peak centered at 474 nm. FIG. 2B shows the exemplary Cs$_4$CaBrI$_5$:Eu 4% scintillator having a single peak centered at 469 nm. FIG. 2C shows the exemplary Cs$_4$CaBr$_6$:Eu 4% scintillator having a single peak centered at 459 nm. FIG. 2D shows the exemplary Cs$_4$SrI$_6$:Eu 4% scintillator having a single peak centered at 468 nm. FIG. 2E shows the exemplary K$_4$SrI$_6$:Eu 4% scintillator having a single peak centered at 455 nm. FIG. 2F shows the exemplary Cs$_4$BaI$_6$:Eu 4% scintillator having a single peak centered at 460 nm.

FIGS. 3A-3F are graphs showing pulse height spectra corresponding to the exemplary scintillators in Table I. Scintillation light yield of the exemplary scintillators was measured using a Hamamatsu H3177-50 photomultiplier tube (PMT). Gamma-ray energy spectra and energy resolution were recorded using a $^{137}$Cs as excitation source. The exemplary scintillators were placed in a quartz container filled with mineral oil to protect them from moisture during the measurement. The mineral oil also served as optical coupling between the quartz container and the PMT such that scintillation light generated in the scintillators would transmit to the PMT for measurement. A Spectralon hemispherical dome was used as a reflector to improve the scintillation light collection into the PMT and a shaping time of 10 µs was used to ensure the complete integration of the light pulse. The photopeaks were fitted with a Gaussian function to determine the centroid of the peak. The conversion from the number of measured photoelectrons to the number of photon per unit of γ-ray energy (i.e., ph/MeV) emitted by a scintillator, i.e., the scintillator's light yield, was accomplished by convolving the quantum efficiency of the PMT as a function of wavelength (measured by Hamamatsu, the manufacturer of the PMT) with the emission spectrum of the scintillator.

Figure 3A:
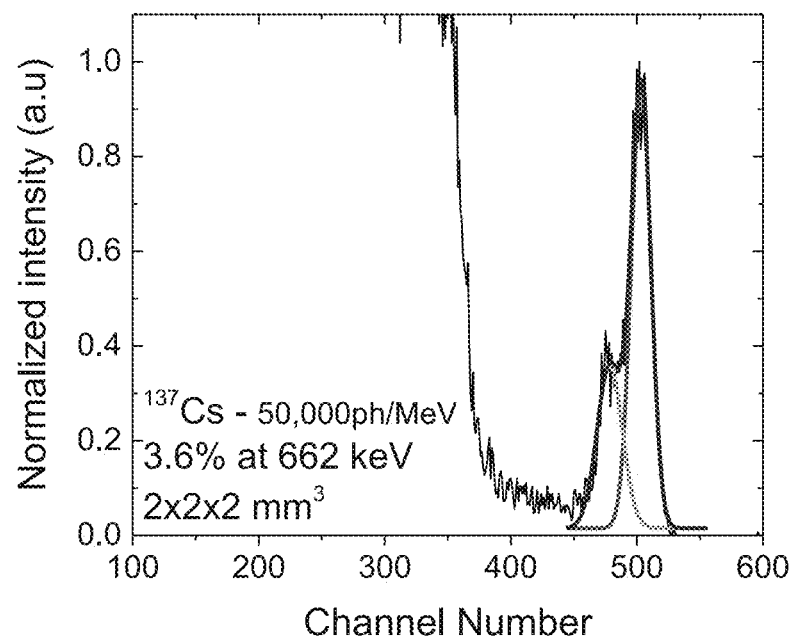
FIGS. 3A-3F are graphs showing pulse height spectra of exemplary scintillators.
Figure 3B:
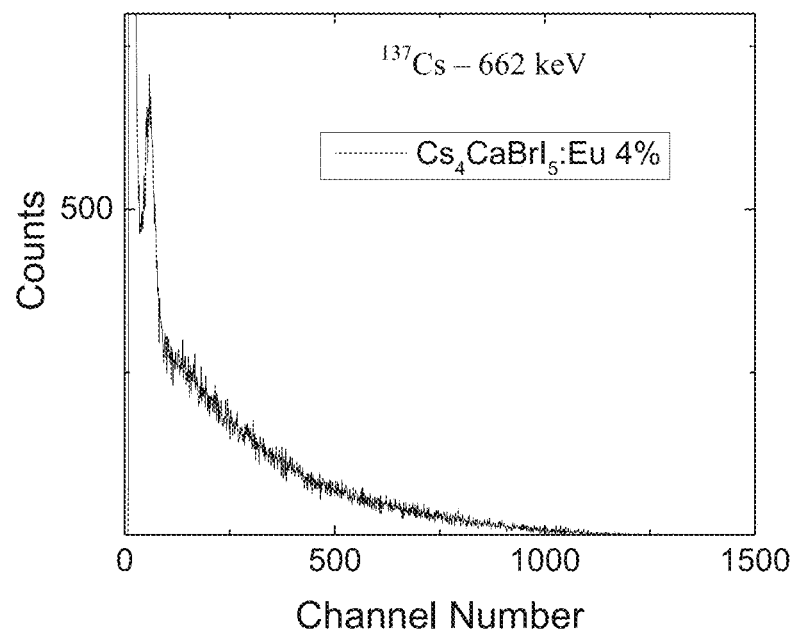
Figure 3C:
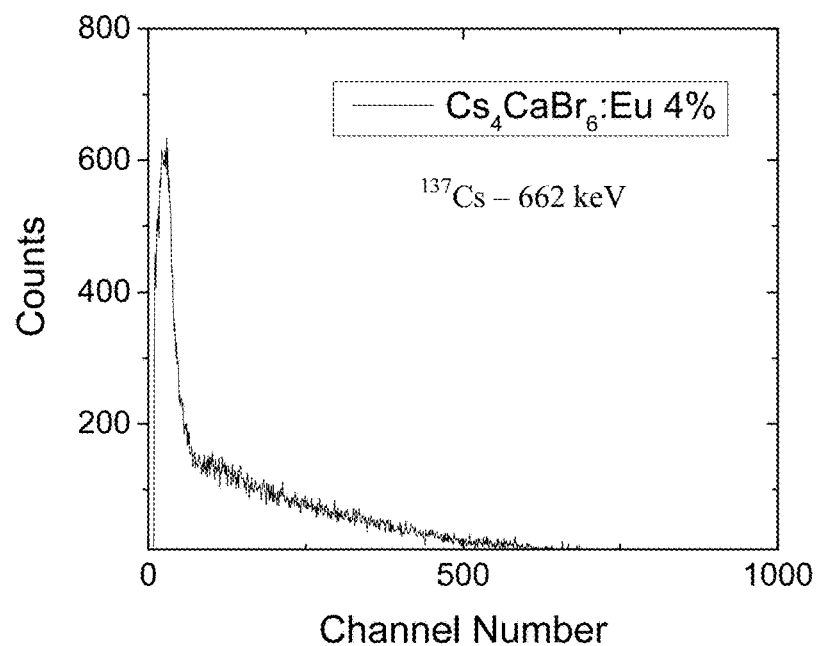
Figure 3D:
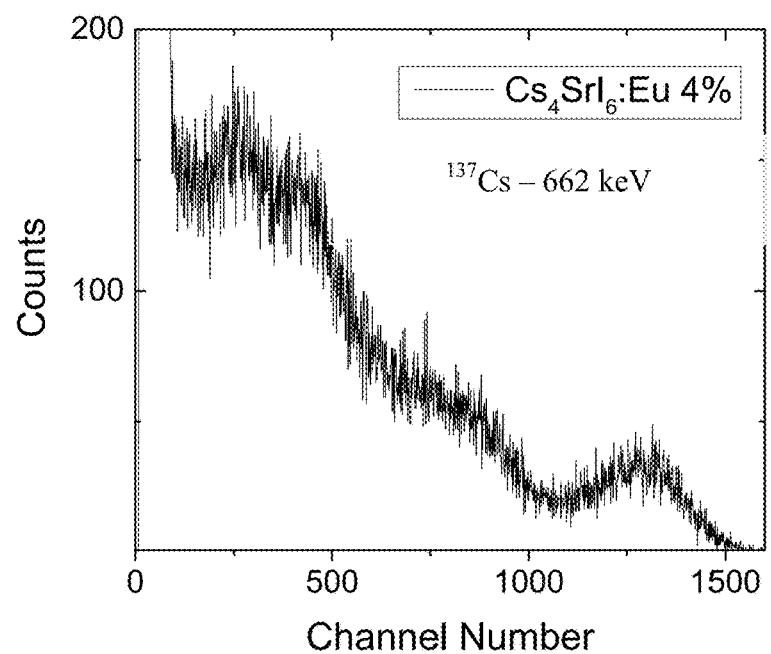
Figure 3E:
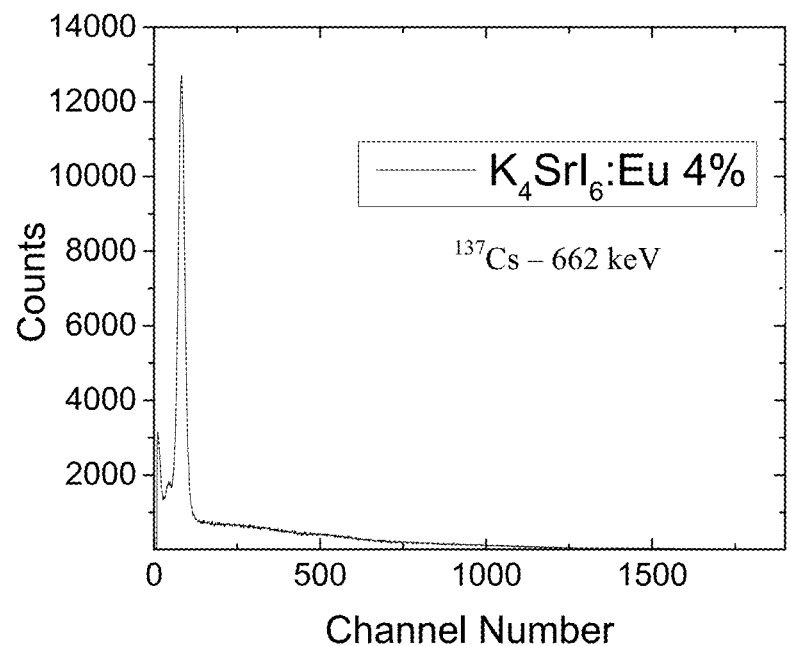
Figure 3F:
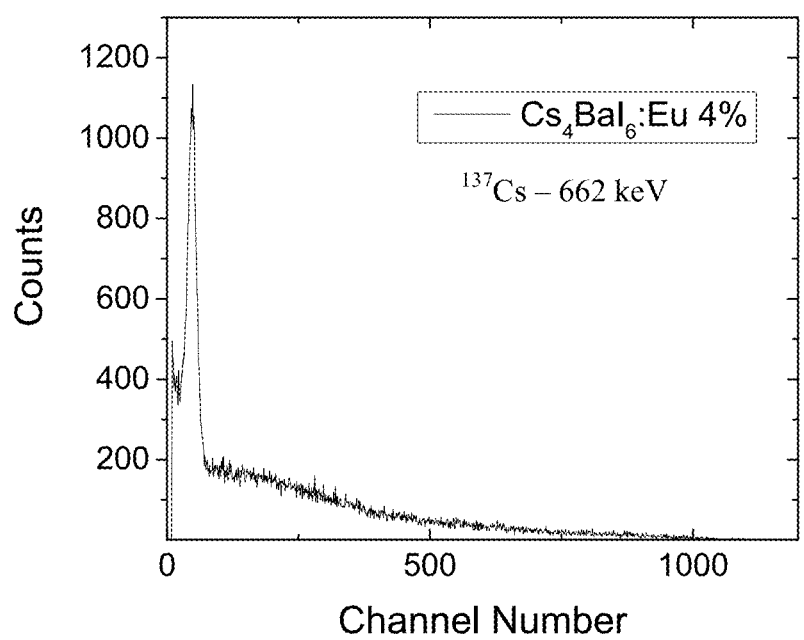

In FIG. 3A, the pulse height spectrum of the exemplary Cs$_4$CaI$_6$:Eu 4% scintillator (crystal dimensions: 2×2×2 mm$^3$) under $^{137}$Cs excitation is shown to exhibit a light yield of 50,000 ph/MeV and an energy resolution of 3.6% at 662 keV. FIGS. 3B-3F show pulse height spectra of the exemplary Cs$_4$CaBrI$_5$:Eu 4%, Cs$_4$CaBr$_6$:Eu 4%, Cs$_4$SrI$_6$:Eu 4%, K$_4$SrI$_6$:Eu 4%, and Cs$_4$BaI$_6$:Eu 4% scintillators, respectively, under $^{137}$Cs excitation at 662 keV.

FIGS. 4A-4F are graphs showing scintillation decay profiles, corresponding to the exemplary scintillators in Table I. Scintillation decay time was recorded using a $^{137}$Cs source and the time-correlated single photon counting technique described by L. M. Bollinger, et al., in "Measurement of Time Dependence of Scintillation Intensity by a Delayed-Coincidence Method," *The Review of Scientific Instruments*, 1961, 32, 1044-1050. The decay profiles are fitted with exponential decay functions.

Figure 4A:
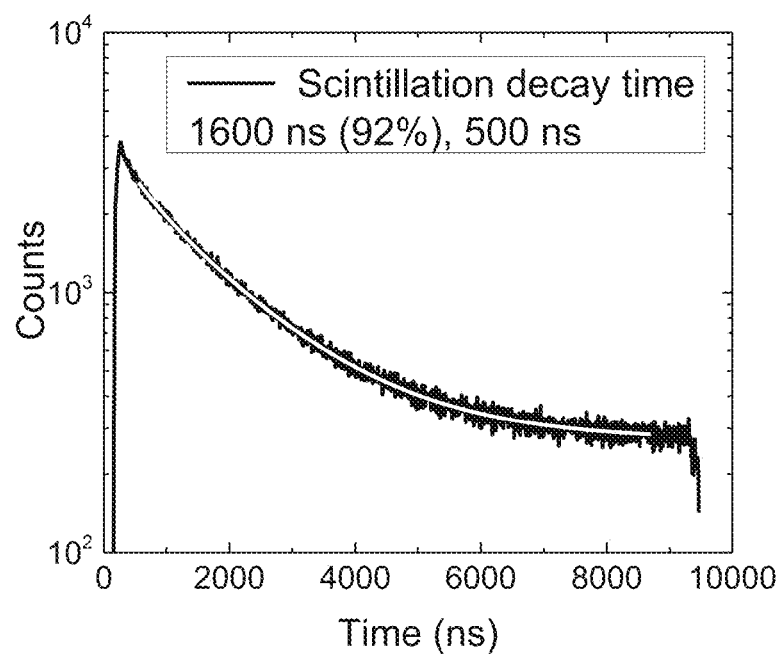
FIGS. 4A-4F are graphs showing scintillation decay profiles of exemplary scintillators.
Figure 4B:
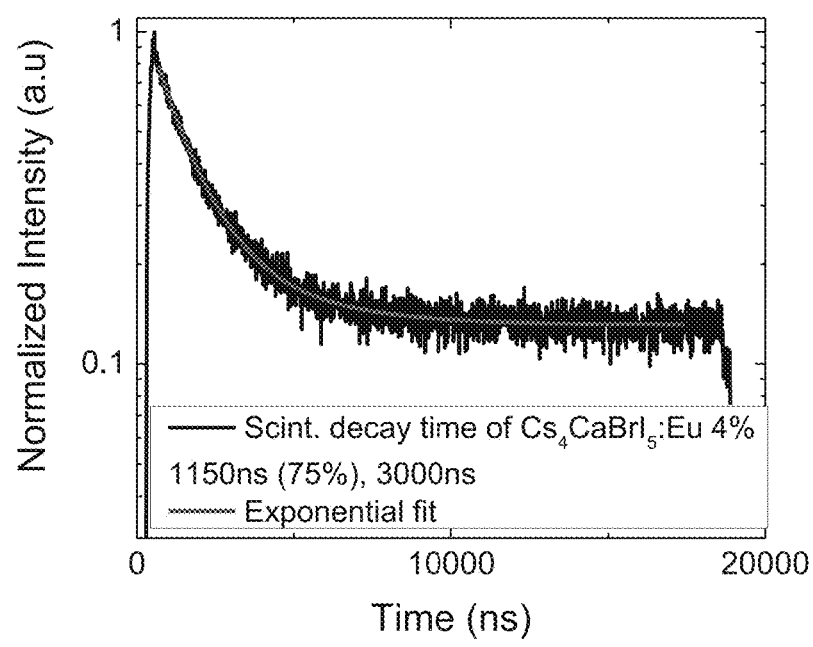
Figure 4C:
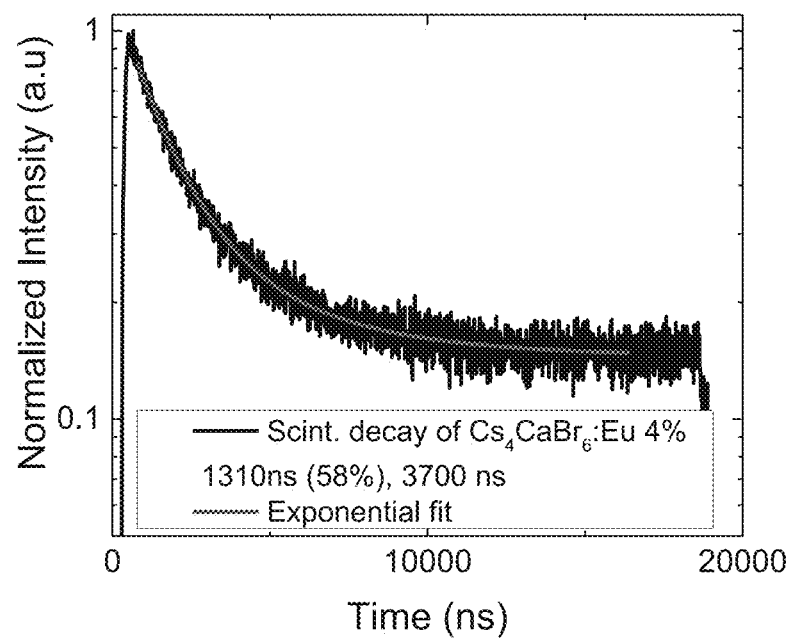
Figure 4D:
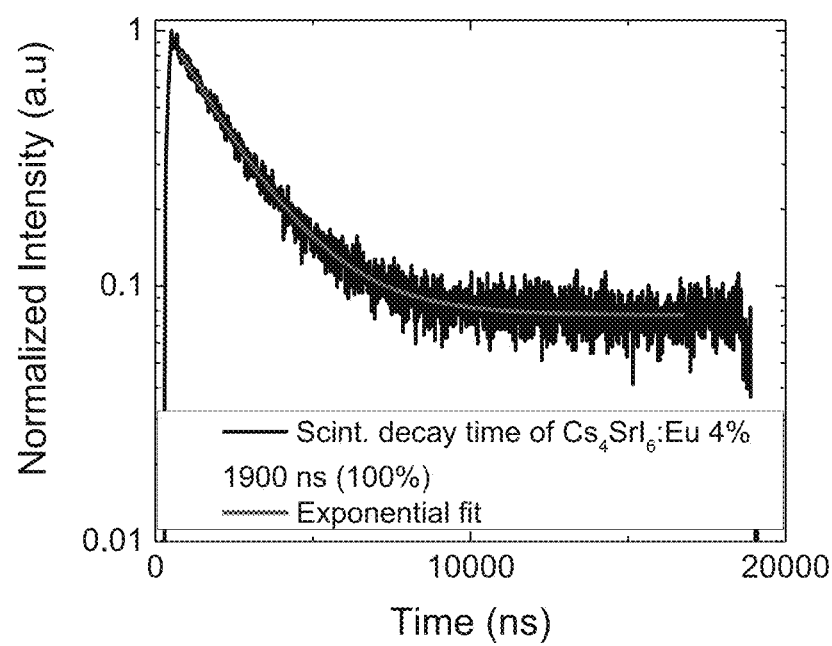
Figure 4E:
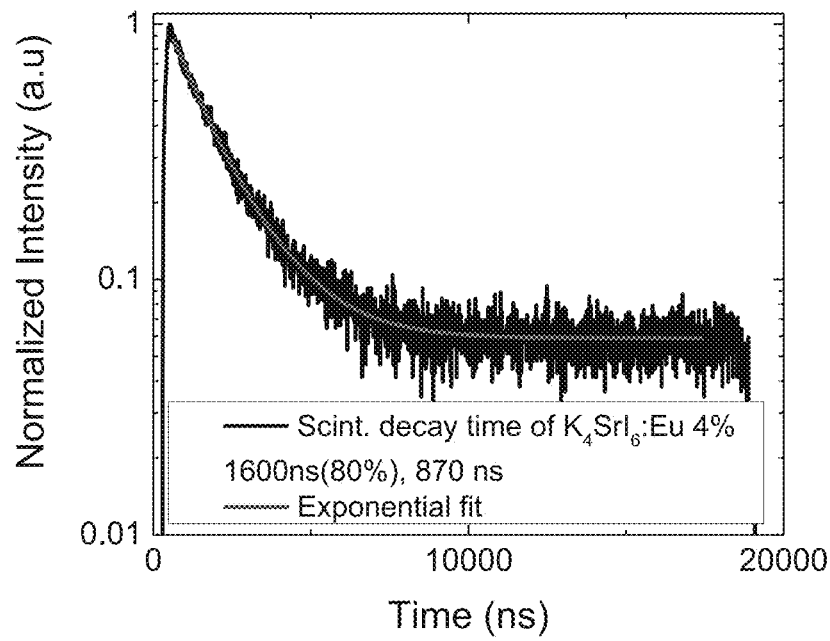
Figure 4F:
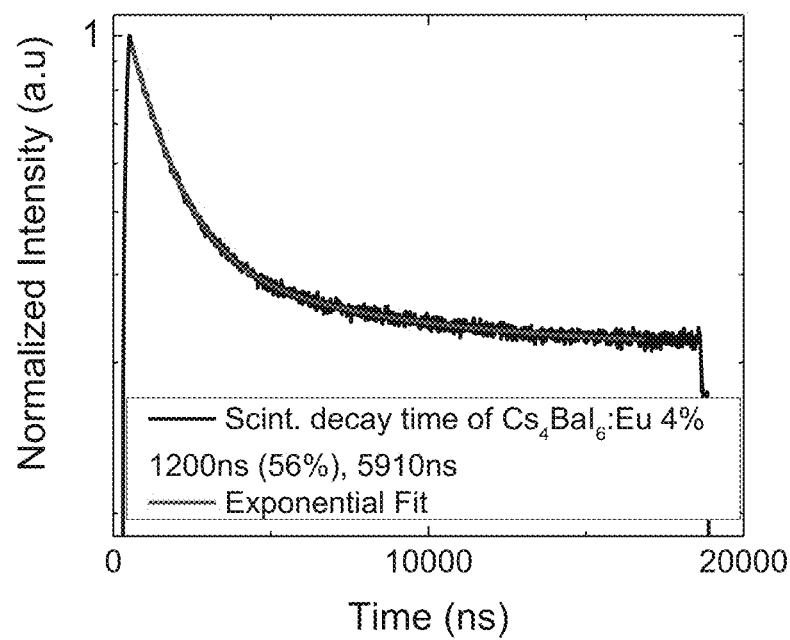

FIG. 4A shows the scintillation decay profile of the exemplary Cs$_4$CaI$_6$:Eu 4% scintillator, fitted with a two-component exponential decay function having a primary component lasting 1600 ns and accounting for 92% of the total light output and a second component lasting 500 ns and accounting for the remaining light. Similarly, FIGS. 4B-4F show scintillation decay profiles of the exemplary Cs$_4$CaBrI$_5$:Eu 4%, Cs$_4$CaBr$_6$:Eu 4%, Cs$_4$SrI$_6$:Eu 4%, K$_4$SrI$_6$:Eu 4%, and Cs$_4$BaI$_6$:Eu 4% scintillators, fitted with a two-component exponential decay functions.

According to another embodiment, three exemplary crystals of scintillators of the formula (1) (Cs$_4$SrI$_6$:Eu 4%, Cs$_3$KCaI$_6$:Eu 0.5% and Cs$_3$KSrI$_6$:Eu 0.5%) were grown by the vertical Bridgman-Stockbarger technique using a two-zone transparent furnace. At least 4N-purity raw materials were mixed and loaded into quartz ampoules in a dry glove box with moisture and oxygen content of less than 0.01 ppm. The starting materials were subsequently dried in the quartz ampoules under 10$^{-6}$ torr vacuum at 200° C. A pre-synthesis stage was carried out by reacting the starting materials at 20° C. above the melting points of all the components for 12 hours and then allowed to cool to room temperature over a 10-hour period. The resulting exemplary Cs$_4$SrI$_6$:Eu 4%, Cs$_3$KCaI$_6$:Eu 0.5% and Cs$_3$KSrI$_6$:Eu 0.5% crystals are shown in FIGS. 5A-5C, respectively.

Figure 5A:
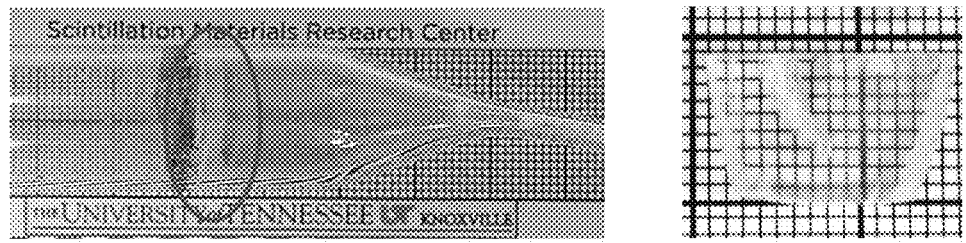
FIGS. 5A-5D show crystals of exemplary scintillators.
Figure 5B:
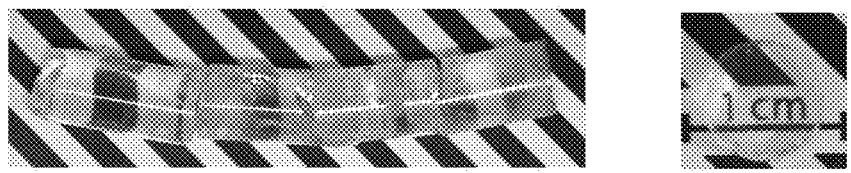
Figure 5C:
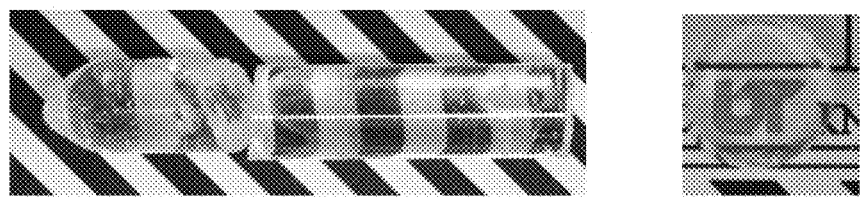

In particular, FIG. 5A shows on the left a 15-mm diameter single Cs$_4$SrI$_6$:Eu 4% crystal in an ampoule under ambient light, and on the right a 5-mm thick specimen of the Cs$_4$SrI$_6$:Eu 4% crystal under ambient light. Shown in FIG. 5B on the left is an 8-mm diameter bare single Cs$_3$KCaI$_6$:Eu 0.5% crystal under ambient light, and on the right is an 8-mm diameter by 2-mm thick slab of the Cs$_3$KCaI$_6$:Eu 0.5% crystal under ambient light. An 8-mm diameter bare single Cs$_3$KSrI$_6$:Eu 0.5% crystal under ambient light is shown on the left of FIG. 5C, and an 8-mm diameter by 2-mm thick slab of the Cs$_3$KSrI$_6$:Eu 0.5% crystal under ambient light is shown on the right of FIG. 5C.

Figure 5D:

According to yet another embodiment, two exemplary crystals of scintillators of the formula (2) (Cs$_4$SrI$_6$:In 4% and Cs$_4$SrI$_6$:Ce 4%) and two exemplary crystals of undoped scintillators (Cs$_4$SrI$_6$ and Cs$_4$CaI$_6$) were formed by rapid synthesis. These crystals were obtained by reacting the raw materials at 20° C. above the melting points of all the components for 12 hours and then allowed to cool to room temperature over a 10-hour period. The resulting Cs$_4$SrI$_6$:In 4%, undoped Cs$_4$SrI$_6$, and Cs$_4$SrI$_6$:Ce 4% crystals under ultraviolet (UV) excitation are shown in FIG. 5D, from top to bottom respectively. The undoped Cs$_4$CaI$_6$ crystal is not shown.

FIGS. 6A-6D are graphs showing pulse height spectra of the exemplary Cs$_4$SrI$_6$:Eu 4%, Cs$_3$KCaI$_6$:Eu 0.5%, Cs$_3$KSrI$_6$:Eu 0.5%, and undoped Cs$_4$CaI$_6$ scintillator crystals, respectively. The scintillation light yield was measured by coupling each exemplary scintillator crystal to a Hamamatsu 82059 PMT. The single photoelectron technique was used to measure the number of photons per unit of γ-ray energy (i.e., ph/MeV) emitted by each exemplary scintillator crystal. The energy resolution for each crystal was measured using a Hamamatsu R6231-100 PMT. Each crystal was placed in a quartz container filled with mineral oil to protect them from moisture during the measurements. The mineral oil also served as optical coupling between the quartz container and the PMT. A Spectralon hemispherical diffuse reflector dome and a shaping time of 10 μs were used.

Figure 6A:
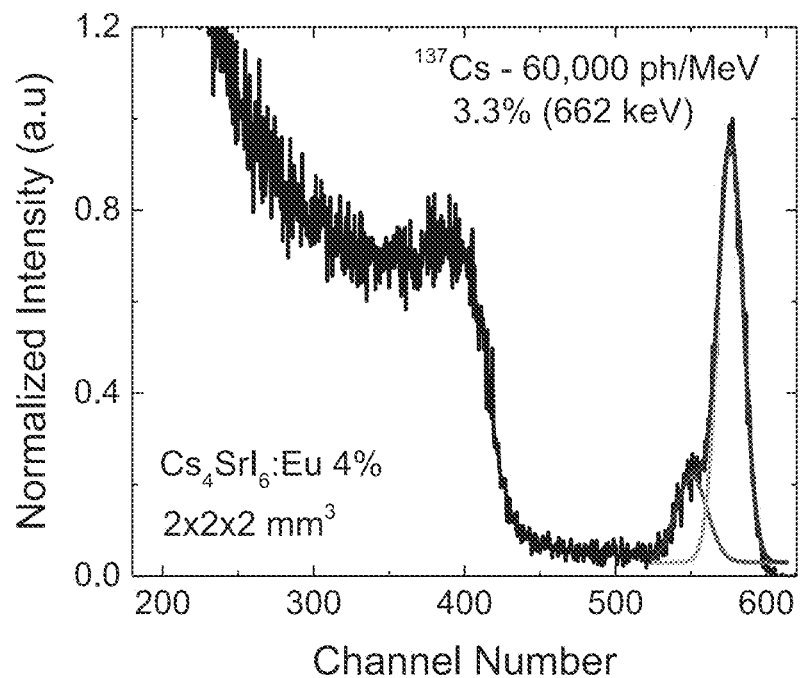
FIGS. 6A-6D are graphs showing pulse height spectra of exemplary scintillators.
Figure 6B:
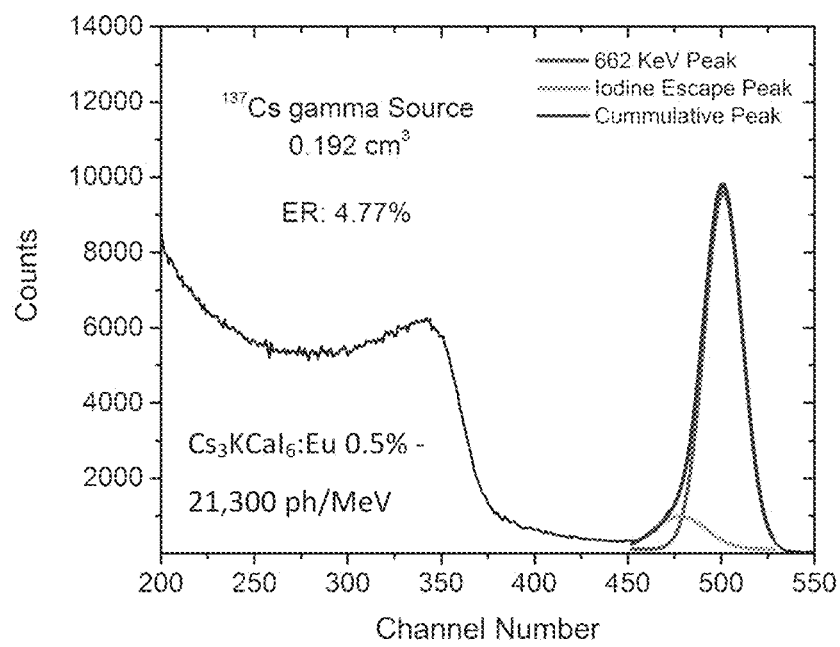
Figure 6C:
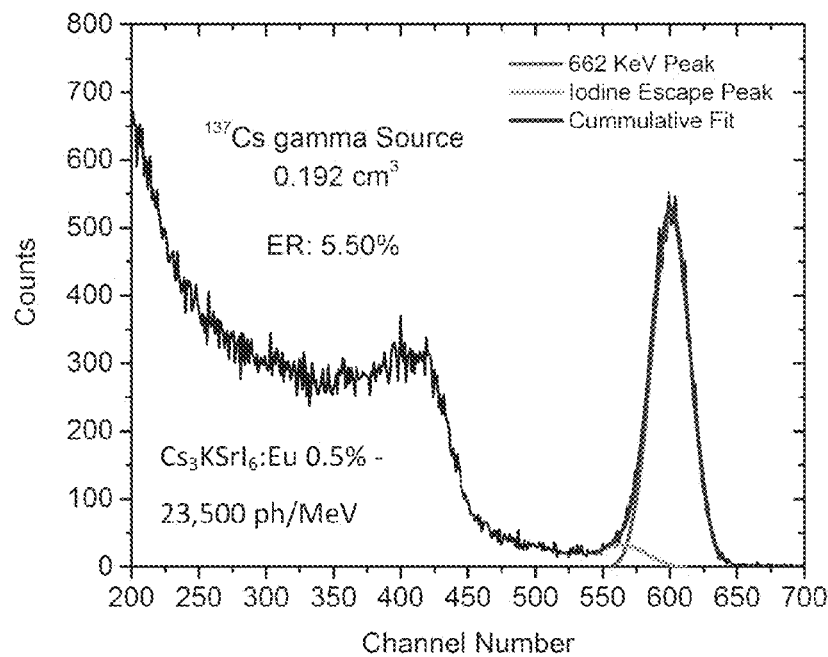
Figure 6D:
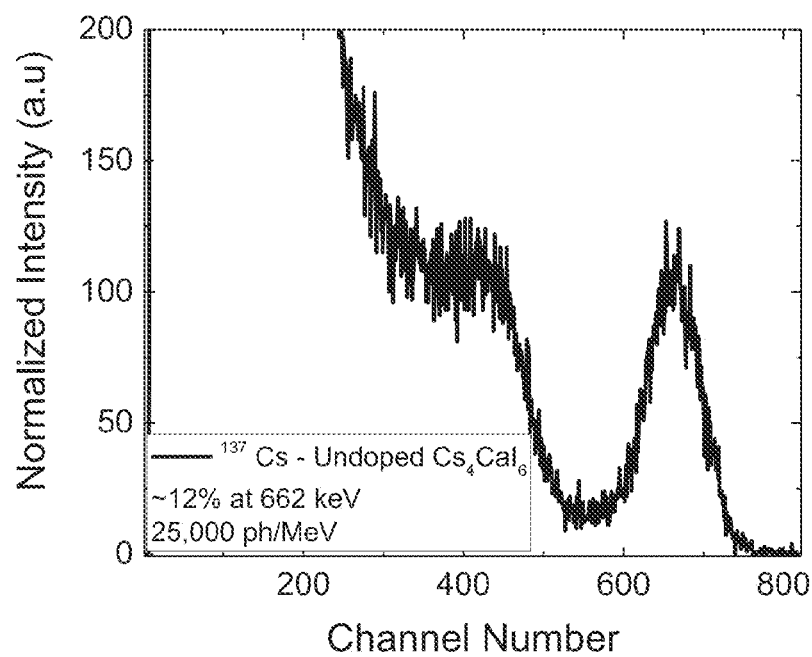
Figure 7A:
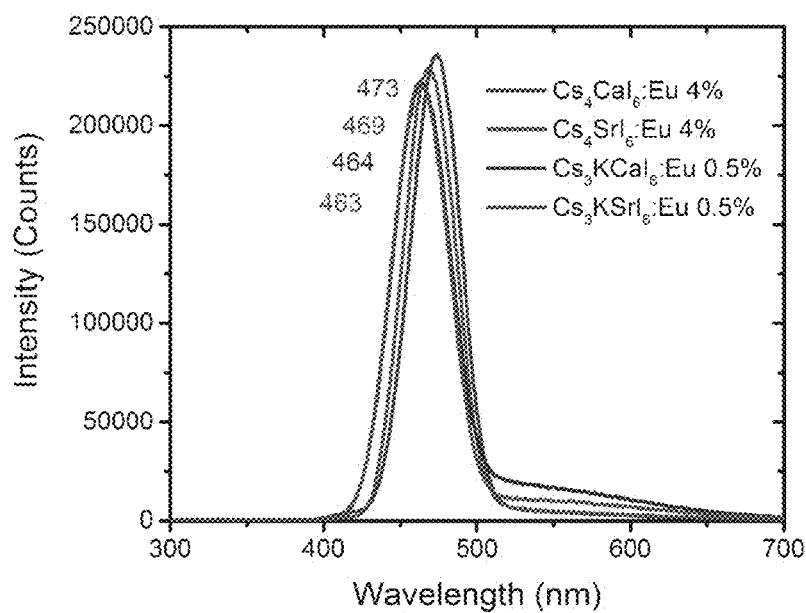
FIGS. 7A-7C are graphs showing X-ray excited radioluminescence spectra of exemplary scintillators.
Figure 7B:
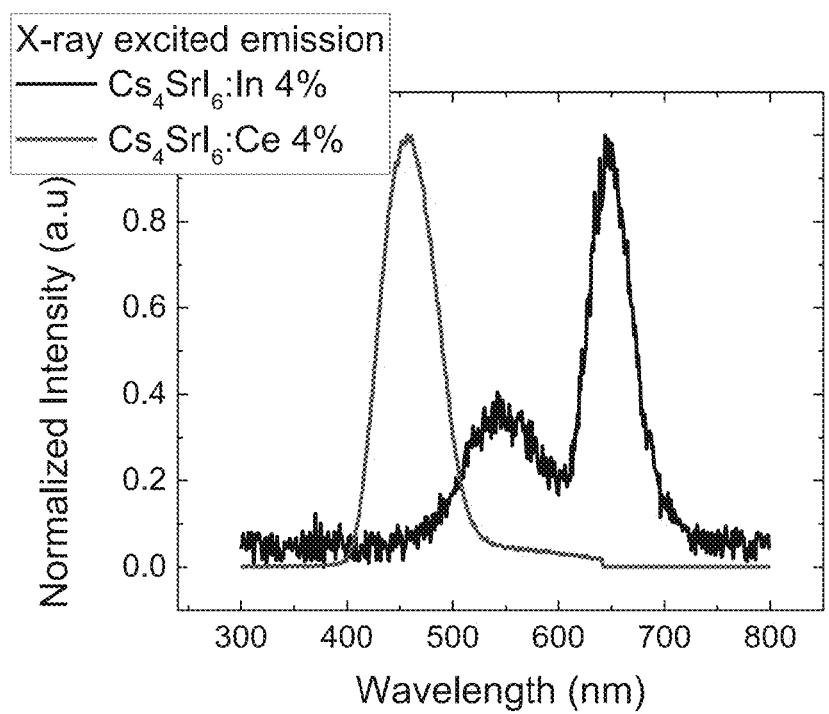
Figure 7C:
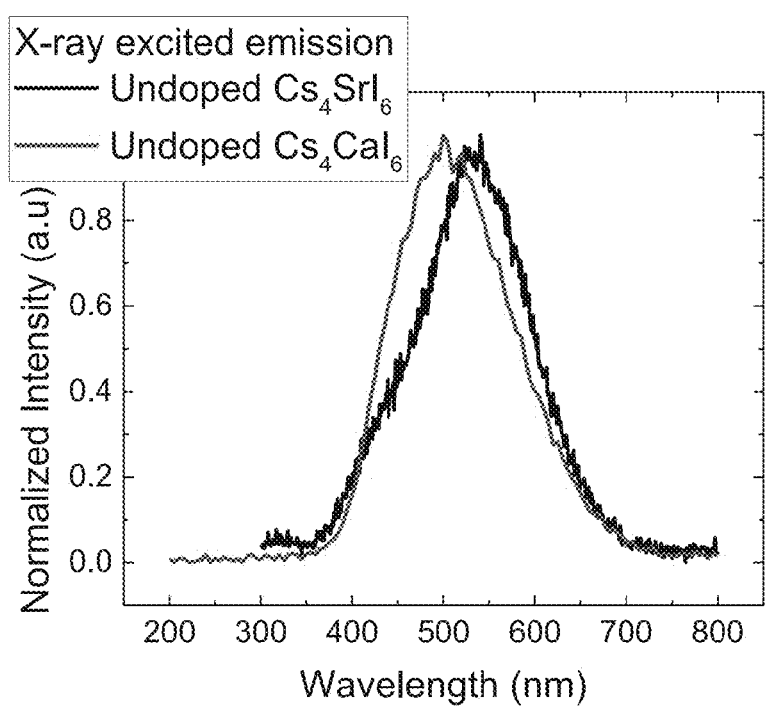

FIG. 6A shows the pulse height spectrum of the exemplary $Cs_4SrI_6$:Eu 4% scintillator (crystal dimensions: 2×2×2 mm³) under $^{137}$Cs excitation, exhibiting a light yield of 60,000 ph/MeV and an energy resolution of 3.3% at 662 keV. FIG. 6B shows the pulse height spectrum of the exemplary $Cs_3KCaI_6$:Eu 0.5% scintillator under $^{137}$Cs excitation, exhibiting a light yield of 21,300 ph/MeV and an energy resolution of 4.77% at 662 keV. FIG. 6C shows the pulse height spectrum of the exemplary $Cs_3KSrI_6$:Eu 0.5% scintillator under $^{137}$Cs excitation, exhibiting a light yield of 23,500 ph/MeV and an energy resolution of 5.50% at 662 keV. The pulse height spectra in FIGS. 6A-6C are fitted with a Gaussian function to determine the centroid of the peak. FIG. 6D shows the pulse height spectrum of the exemplary undoped $Cs_4CaI_6$ scintillator under $^{137}$Cs excitation, exhibiting a light yield of 25,000 ph/MeV and an energy resolution of 12% at 662 keV FIGS. 7A-7C are graphs showing X-ray excited radioluminescence spectra of the exemplary $Cs_4SrI_6$:Eu 4%, $Cs_3KCaI_6$:Eu 0.5%, $Cs_3KSrI_6$:Eu 0.5%, $Cs_4SrI_6$:In 4%, $Cs_4SrI_6$:Ce 4%, undoped $Cs_4SrI_6$, and undoped $Cs_4CaI_6$ scintillators. The radioluminescence spectra were acquired at room temperature under continuous 30-keV X-ray irradiation. The emission spectra were recorded with a 150 mm focal length monochromator over a wavelength range of 200 to 800 nm.

FIG. 7A shows the radioluminescence spectra of the exemplary $Cs_4SrI_6$:Eu 4%, $Cs_3KCaI_6$:Eu 0.5%, and $Cs_3KSrI_6$:Eu 0.5% scintillators having single peaks at 469 nm, 464 nm, and 463 nm, respectively. FIG. 7A also includes the radioluminescence spectrum of an exemplary $Cs_4CaI_6$:Eu 4% scintillator having a single peak at 473 nm. FIG. 7B shows the radioluminescence spectra of the exemplary $Cs_4SrI_6$:In 4% and $Cs_4SrI_6$:Ce 4% scintillators. FIG. 7C shows the radioluminescence spectra of the exemplary undoped $Cs_4SrI_6$ and undoped $Cs_4CaI_6$ scintillators.

It shall be appreciated that the disclosure may be not limited to the described embodiments, and that any number of scenarios and embodiments in which conflicting appointments exist may be resolved.

Although the disclosure has been described with reference to several exemplary embodiments, it shall be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

The illustrations of the examples and embodiments described herein are intended to provide a general understanding of the various embodiments, and many other examples and embodiments may be apparent to those of skill in the art upon reviewing the disclosure. Other embodiments may be utilized and derived from the disclosure, such that structural and logical substitutions and changes may be made without departing from the scope of the disclosure.

Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be to be determined by the broadest permissible interpretation of the following claims and their equivalents, and shall not be restricted or limited by the foregoing detailed description.

What is claimed is:

1. A scintillator comprising a chemical compound having the chemical formula

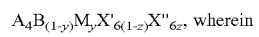

$A_4B_{(1-y)}M_yX'_{6(1-z)}X''_{6z}$, wherein

0≤y≤1,
0≤z≤1,
M is Eu,
X' is Br or I, and
X" is different from X' and is one of F, Cl, Br, and I, or any combination thereof, and wherein
  A is Cs, B is Ca, X' is I, M is Eu, and z=0; or
  A is Cs, B is Ca, X' is Br, X" is I, M is Eu, and z=5/6; or
  A is Cs, B is Ca, X' is Br, M is Eu, and z=0; or
  A is K, B is Sr, X' is I, M is Eu, and z=0; or
  A is a combination of Cs and K, B is Ca, X' is I, M is Eu, and z=0; or
  A is Cs, B is Ca, X' is I, y=0, and z=0.

2. The scintillator of claim 1, wherein M is $Eu^{2+}$.

3. The scintillator of claim 1, wherein A is Cs, B is Ca, X' is I, M is Eu, and z=0.

4. The scintillator of claim 1, wherein A is Cs, B is Ca, X' is Br, X" is I, M is Eu, and z=5/6.

5. The scintillator of claim 1, wherein A is Cs, B is Ca, X' is Br, M is Eu, and z=0.

6. The scintillator of claim 1, wherein A is K, B is Sr, X' is I, M is Eu, and z=0.

7. The scintillator of claim 1, wherein A is a combination of Cs and K, B is Ca, X' is I, M is Eu, and z=0.

8. The scintillator of claim 1, wherein A is Cs, B is Ca, X' is I, y=0, and z=0.

9. A scintillator comprising a chemical compound having the chemical formula $$A_{(4-y)}BM_yX'_{6(1-z)}X''_{6z}, \text{ wherein}$$

$0 \leq y \leq 1$,

A is Cs, B is Sr, X' is I, M is In, and z=0.

10. The scintillator of claim 9, wherein M is $In^+$.

11. The scintillator of claim 9, wherein y=0.

12. A scintillator comprising a chemical compound having the chemical formula $A_4B_{(1-y)}M_yX'_{6(1-z)}X''_{6z}$, wherein $0 \leq y \leq 1$, $0 \leq z \leq 1$, A is a combination of Cs and at least one selected from the group consisting of Li, Na, K, Rb and In, B is Ca, or B is Mg, or B is a combination of two or more selected from the group consisting of Mg, Ca, Sr, and Ba, M is one of Eu and Yb, X' is one of F, Cl, Br, and I, or any combination thereof, and X'' is different from X' and is one of F, Cl, Br, and I, or any combination thereof.

13. The scintillator of claim 12, wherein M is one of $Eu^{2+}$ and $Yb^{2+}$.

14. A scintillator comprising a chemical compound having the chemical formula $A_4B_{(1-y)}M_yX'_{6(1-z)}X''_{6z}$, wherein $0 \leq y \leq 1$, $0 \leq z \leq 1$, A is a combination of Cs and at least one selected from the group consisting of Li, Na, K, Rb, In and Tl, B is Ca, or B is Mg, or B is a combination of two or more selected from the group consisting of Mg, Ca, Sr, and Ba, M is one of Eu and Yb, X' is one of F, Cl, Br, and I, or any combination thereof, and X'' is different from X' and is one of F, Cl, Br, and I, or any combination thereof.

15. The scintillator of claim 14, wherein M is one of $Eu^{2+}$ and $Yb^{2+}$.

16. The scintillator of claim 14, wherein A is a combination of Cs and Tl, and M is Eu.

17. The scintillator of claim 14, wherein A is a combination of Cs, K and Tl, B is Ca, X' is I, M is Eu, and z=0.

* * * * *